US010336926B2

(12) United States Patent
Kukreja et al.

(10) Patent No.: US 10,336,926 B2
(45) Date of Patent: Jul. 2, 2019

(54) OXAZOLINE-BASED ADHESIVE FORMULATIONS

(71) Applicant: Sanford, L.P., Atlanta, GA (US)

(72) Inventors: Joginder Kukreja, Brookline (CA); Van R. Foster, Westerville, OH (US)

(73) Assignee: Sanford, L.P., Atlanta, GA (US)

( * ) Notice: Subject to any disclaimer, the term of this patent is extended or adjusted under 35 U.S.C. 154(b) by 0 days.

(21) Appl. No.: 15/777,550

(22) PCT Filed: Dec. 2, 2016

(86) PCT No.: PCT/US2016/064623
§ 371 (c)(1),
(2) Date: May 18, 2018

(87) PCT Pub. No.: WO2017/096169
PCT Pub. Date: Jun. 8, 2017

(65) Prior Publication Data
US 2018/0327642 A1 Nov. 15, 2018

Related U.S. Application Data

(60) Provisional application No. 62/262,612, filed on Dec. 3, 2015.

(51) Int. Cl.
*C09J 179/06* (2006.01)
*C08G 73/02* (2006.01)
*C09J 189/00* (2006.01)
*C08L 79/02* (2006.01)
*C09J 9/00* (2006.01)
*C09J 11/06* (2006.01)
*C09J 11/08* (2006.01)

(52) U.S. Cl.
CPC ........ *C09J 179/06* (2013.01); *C08G 73/0233* (2013.01); *C08L 79/02* (2013.01); *C09J 9/005* (2013.01); *C09J 11/06* (2013.01); *C09J 11/08* (2013.01); *C09J 189/005* (2013.01)

(58) Field of Classification Search
CPC .................. C09J 189/005; C09J 179/04
See application file for complete search history.

(56) References Cited

U.S. PATENT DOCUMENTS

| | | | | | |
|---|---|---|---|---|---|
| 4,436,789 | A * | 3/1984 | Davis | ...................... | C08L 79/04 428/537.5 |
| 4,867,966 | A * | 9/1989 | Grollier | ................. | A61K 8/731 424/70.12 |
| 5,292,782 | A * | 3/1994 | Bastioli | ................ | C08K 5/0016 524/367 |
| 5,412,005 | A * | 5/1995 | Bastioli | ................. | A61L 15/225 524/366 |
| 5,777,022 | A * | 7/1998 | Bugajski | .................. | C08J 7/047 524/195 |
| 6,566,426 | B1 * | 5/2003 | Kanaida | .................... | C08K 3/10 524/413 |
| 2004/0110867 | A1 * | 6/2004 | McCovick | ............. | C09D 11/30 523/160 |
| 2007/0231554 | A1 * | 10/2007 | Bastioli | ................ | A01K 15/026 428/219 |
| 2009/0312472 | A1 * | 12/2009 | Hardy | .................... | C08K 5/098 524/322 |
| 2010/0069533 | A1 * | 3/2010 | Brady | ..................... | C08L 97/02 524/13 |
| 2010/0184937 | A1 * | 7/2010 | Harris | .................. | C08G 65/329 528/44 |
| 2010/0215957 | A1 * | 8/2010 | Tajima | .................... | C08F 24/00 428/401 |
| 2011/0159768 | A1 * | 6/2011 | Crescimanno | ........ | C08F 269/00 442/327 |
| 2011/0301260 | A1 | 12/2011 | Kukreja et al. | | |
| 2012/0021147 | A1 * | 1/2012 | Liao | ....................... | B41M 5/506 428/32.21 |
| 2012/0059092 | A1 | 3/2012 | Lux et al. | | |
| 2012/0105558 | A1 * | 5/2012 | Li | ......................... | C09D 11/326 347/100 |
| 2013/0109801 | A1 * | 5/2013 | Coffey | ................ | C08L 23/0853 524/524 |
| 2013/0278689 | A1 * | 10/2013 | Sowinski | ................. | B41J 2/105 347/90 |
| 2015/0118166 | A1 * | 4/2015 | Sagel | ...................... | A61K 8/362 424/49 |
| 2015/0147502 | A1 * | 5/2015 | Lindenmuth | ........... | C08L 23/02 428/35.7 |

FOREIGN PATENT DOCUMENTS

EP  2163590 A1  3/2010

OTHER PUBLICATIONS

Sancure 2710 (https://coatings.specialchem.com/product/r-lubrizol-sancure-2710, 2018). (Year: 2018).*
International Search Report and Written Opinion for International Application No. PCT/US2016/064623 dated Mar. 17, 2017 (12 pages).

* cited by examiner

*Primary Examiner* — Liam J Heincer
(74) *Attorney, Agent, or Firm* — Eversheds Sutherland (US) LLP

(57) ABSTRACT

Adhesive formulations and methods for making adhesive formulations are provided. An adhesive formulation includes at least one oxazoline polymer and casein. Methods of making adhesive formulations include combining at least one oxazoline polymer and casein to form the adhesive formulation. Glue sticks made using these adhesive formulations and methods are also provided.

12 Claims, No Drawings

OXAZOLINE-BASED ADHESIVE FORMULATIONS

CROSS-REFERENCE TO RELATED APPLICATIONS

The instant application is a U.S. national stage application claiming priority to International Application No. PCT/US2016/064623, filed Dec. 2, 2016, which claims priority to U.S. Provisional Application No. 62/262,612, filed Dec. 3, 2015, the disclosures of which are incorporated by reference herein in their entirety.

FIELD OF THE DISCLOSURE

The present disclosure relates in general to products and formulations containing adhesives, and more specifically to oxazoline-based adhesive formulations.

BACKGROUND

Glue sticks are commonly used in the stationery field to glue paper and other craft materials to one another or to other materials, and such products are typically used by both adults and children. Commercially available glue stick formulations typically utilize either a polyvinylpyrrolidone (PVP) or a modified-poly(vinyl acetate) (PVA) polymer, although PVP-based formulations typically provide better performance compared with modified-PVA formulas, including ease of lubricity, package stability, and better adhesion.

Although modified PVA-based products can be formulated to deliver faster adhesion development, they often lack many of the aforementioned properties of PVP-based formulas. Material and formulation properties such as non-toxicity, ease of application from a suitable dispenser, and water based clean-up are important to the end-user of such glue formulations. While commercially available glue sticks typically possess these properties, such products have not found strong utility in and/or acceptance for Do-It-Yourself (DIY) applications, such as home improvement and repair, craft, and construction projects, due to the increased adhesion properties desired in these applications. Thus, there is a need for glue formulations that provide the benefits of both PVA-based and PVP-based formulas and that provide, among other properties, high adhesion, non-toxicity, ease of application from a suitable dispenser, and water based clean-up.

SUMMARY

In one aspect, adhesive formulations are provided. The adhesive formulations include at least one oxazoline polymer and casein. Further ingredients and combinations of ingredients may be included to achieve the desired properties of the adhesive formulations.

In another aspect, methods of making adhesive formulations are provided. The methods include combining at least one oxazoline polymer and casein to form an adhesive formulation. Further ingredients and combinations of ingredients may be combined to achieve the desired properties of the adhesive formulations.

In yet another aspect, glue sticks and other glue products including the adhesive formulations described herein are also provided.

DETAILED DESCRIPTION

The present disclosure relates to adhesive (i.e., glue) formulations that provide, among other properties, high adhesion, non-toxicity, ease of application from a suitable dispenser, and water based clean-up. Such adhesive formulations may be particularly suitable for use in the form of a glue stick or other glue product. In particular, glue sticks formed from the adhesive formulations described herein may exhibit increased adhesive strength as compared to other commercially available glue formulations.

In one aspect, adhesive formulations are provided that contain at least one oxazoline polymer and casein. The oxazoline polymer may be any water soluble polyoxazoline, such as poly(2-ethyl-2-oxazoline). For example, the oxazoline polymer may be poly(2-ethyl-2-oxazoline), commercially available as AQUAZOL 50 and AQUAZOL 200, manufactured by Polymer Chemistry Innovations, Inc., Tuscon, Ariz. In some embodiments, the at least one oxazoline polymer is present in the adhesive formulation in an amount of from about 5 percent to about 50 percent, by weight of the formulation. For example, the at least one oxazoline polymer may be present in the adhesive formulation in an amount of from about 15 percent to about 35 percent, by weight of the formulation. In certain embodiments, the oxazoline polymer is present in the adhesive formulation in an amount of from about 26 percent to about 31 percent, by weight of the formulation, such as from about 28 to about 31 percent, by weight of the formulation. As used herein, the term "about" means plus or minus 5 percent of the numerical value of the number with which it is being used.

In certain embodiments, at least two oxazoline polymers are combined in the adhesive formulation. For example, two polyoxazolines, such as two poly(2-ethyl-2-oxazoline) polymers having different molecular weights and/or viscosities may be combined. For example, a polyoxazoline having a weight average molecular weight of about 50,000 (e.g., AQUAZOL 50) and a polyoxazoline having a weight average molecular weight of about 200,000 (e.g., AQUAZOL 200) may be combined. In certain embodiments, the adhesive formulation contains from about 8 percent to about 15 percent, by weight of the adhesive formulation, of a polyoxazoline having a molecular weight of about 50,000 (e.g., AQUAZOL 50) and from about 10 percent to about 20 percent, by weight of the adhesive formulation, of a polyoxazoline having a molecular weight of about 200,000 (e.g., AQUAZOL 200). In some embodiments, the adhesive formulation contains a greater amount, by weight, of the polyoxazoline having a molecular weight of about 200,000 (e.g., AQUAZOL 200), as compared to the polyoxazoline having a molecular weight of about 50,000 (e.g., AQUAZOL 50).

The adhesive formulations described herein further contain casein. In certain embodiments, the casein is present in the adhesive formulation in an amount of from about 1 percent to about 20 percent, by weight of the formulation. For example, the casein may be present in the adhesive formulation in an amount of from about 4 percent to about 10 percent, by weight of the formulation, such as from about 5 percent to about 9 percent, by weight of the formulation, or from about 6 percent to about 9 percent, by weight of the formulation. In certain embodiments, the casein is combined with the oxazoline polymer in the form of a solution that contains casein in an amount from about 10 percent to about 40 percent, by weight of the solution. For example, the casein solution may further contain an organic amine and deionized water. For example, the organic amine may be 2-amino-2-methyl-1-propanol, commercially available as AMP-95 from ANGUS Chemical Company, Buffalo Grove, Ill. In some embodiments, the casein is present in an amount of about 25 percent, by weight of the solution. In some embodiments, the organic amine is present in an amount of about 5 percent to about 15 percent, by weight of the solution, such as about 10 percent to about 11 percent, by weight of the solution. Without intending to be bound by a particular theory, it is believed that the organic amine is effective to stabilize the casein solution without the use of an inorganic base.

The adhesive formulations described herein may further contain water (e.g., deionized water) and other ingredients, to achieve the desired formulation consistency and properties, as will be described in greater detail. In certain embodiments, the formulation contains deionized water in an amount from about 15 percent to about 35 percent, by weight of the formulation.

In certain embodiments, the adhesive formulation further contains a polyurethane. For example, the polyurethane may be combined with the oxazoline polymer in the form of a dispersion, such as waterborne polyurethane dispersions commercially available as SANCURE 2710 (aliphatic waterborne urethane polymer), SANCURE 12929 (aliphatic waterborne urethane polymer), and SANCURE 20025F (Soft elastic aliphatic polyester urethane polymer dispersion containing 5-10% benzyl benzoate), manufactured by Lubrizol, Brecksville, Ohio. Combinations of such polyurethane dispersions may also be used to achieved the desired properties. In certain embodiments, the total amount of polyurethane dispersion combined with the oxazoline polymer is in the range of about 5 percent to about 15 percent, by weight of the adhesive formulation, such as from about 8 percent to about 12 percent, by weight of the adhesive formulation.

Further additives, and combinations thereof, may optionally be combined with the oxazoline polymer and casein, with or without the polyurethane, to obtain a desired adhesive formulation. For example, adhesive formulations may include at least one additive selected from humectants, defoamers, caustic solutions, fatty acids, adhesion promoters, and slip agents.

For example, a humectant may be glycerin or another suitable hygroscopic substance. For example, glycerin may be present in the adhesive formulation in an amount of from about 1 percent to about 10 percent, by weight of the adhesive formulation, such as from about 2 to about 6 percent, by weight of the adhesive formulation.

For example, a defoamer may be a mineral oil-free silicone defoamer or another suitable anti-foaming agent effective to reduce the formation of foam in the formulation. For example, a suitable defoamer may be BYK 045, which is mineral oil-free silicone defoamer containing an emulsion of foam destroying polysilxoanes, hydrophobic solids and emulsifying agents that is commercially available from Altana Group, Germany. For example, a mineral oil-free silicone defoamer may be present in the adhesive formulation in an amount of from about 0.01 percent to about 1 percent, by weight of the adhesive formulation, such as from about 0.1 percent to about 0.5 percent, by weight of the adhesive formulation.

For example, a caustic solution may be a sodium hydroxide or other suitable chemical solution, such as a 10% sodium hydroxide solution. For example, a 10% sodium hydroxide solution may be present in the adhesive formulation in an amount of from about 0.5 percent to about 5 percent, by weight of the adhesive formulation, such as from about 1 percent to about 3 percent, by weight of the adhesive formulation.

For example, a fatty acid may be a sodium stearate or another suitable fatty acid. For example, sodium stearate may be present in the adhesive formulation in an amount of from about 1 percent to about 10 percent, by weight of the adhesive formulation, such as from about 4 percent to about 6 percent, by weight of the adhesive formulation.

For example, an adhesion promoter may include a gamma-aminopropyltrimethoxysilane, gamma-glycidoxypropyltrimethoxysilane, a combination thereof, or other suitable amino silanes. For example, suitable amino silanes are commercially available as SILQUEST A-1110 and SILQUEST A-187, from Momentive Performance Materials, Wilton, Conn. For example, an amino silane may be present in the adhesive formulation in an amount from about 0.01 percent to about 1 percent, by weight of the adhesive formulation, such as from about 0.05 percent to about 0.5 percent, by weight of the adhesive formulation.

For example, a slip agent may be polyethylene glycol (PEG), an alkali-swellable polyacrylate, a combination thereof, or another suitable substance effective to increase the lubricity of the formulation. For example, a suitable PEG material is CARBOWAX 3350, commercially available from Dow Chemical Company, Midland, Mich. For example, a suitable polyacrylate is PARAGUM 500, commercially available from Royal Adhesives (formerly Parachem), South Bend, Ind. For example, a PEG or a polyacrylate may be present in the adhesive formulation in an amount of from about 0.1 percent to about 5 percent, by weight of the adhesive formulation, such as from about 0.5 percent to about 2 percent, by weight of the adhesive formulation.

Various combinations of the foregoing additives and components are envisioned and intended to fall within the scope of this disclosure.

In certain embodiments, the adhesive formulations described herein are substantially free of PVP or PVA based polymers. As used herein, the terms "substantially free" refers to the formulation containing not more than residual or negligible amounts of PVP or PVA based polymers, such as less than 1 percent, by weight of the formulation.

In certain embodiments, the adhesive formulations disclosed herein display a lap shear strength of greater than 400 psi for a maple/maple substrates and a maple/anodized aluminum substrates, when tested using a one inch by three inch substrate specimens (having 3/16" thickness) of the specified materials with a one square inch overlapped section having the adhesive formulation applied thereto. In some embodiments, the adhesive formulations disclosed herein display a lap shear strength of greater than 600 psi for a maple/maple substrates and a maple/anodized aluminum substrates according to such tests.

In another aspect, methods of making adhesive formulations are provided. Generally, these methods may be used to make any of the adhesive formulations described herein. The method may include combining at least one oxazoline polymer and casein to form an adhesive formulation.

In some embodiments, the at least one oxazoline polymer is combined with the other components in an amount such that oxazoline polymer is present in the adhesive formulation in an amount of from about 5 percent to about 50 percent, by weight of the formulation. In some embodiments, the at least one oxazoline polymer is combined with the other components in an amount such that oxazoline polymer is present in the adhesive formulation in an amount of from about 15 percent to about 35 percent, by weight of the formulation.

In certain embodiments, as described above, at least two oxazoline polymers may be combined in the adhesive formulation. For example, a polyoxazoline having a molecular weight of about 50,000 (e.g., AQUAZOL 50) and a polyoxazoline having a molecular weight of about 200,000 (e.g., AQUAZOL 200) may be blended with water and stored at a high temperature, and then mixed to be substantially homogenous. For example, at least two oxazoline polymers may be mixed with deionized water, stored at a temperature between 70 and 90° C. for a period of at least 4 hours, and then mixed to form a substantially homogenous mixture, prior to combination with the casein. For example, the mixture may be stored for a period of about 6 to about 8 hours.

The oxazoline polymer (or the blend of multiple oxazoline polymers) may then optionally be combined with additives such as the humectants and defoamers described above, in the amounts described above, and the mixture may be mixed gently. For example, a humectant that includes glycerin and a defoamer that includes a mineral oil-free silicone defoamer may be combined with the at least one oxazoline polymer, prior to combination with the casein.

A polyurethane dispersion may then also optionally be combined with the oxazoline polymer(s), in the forms and amounts described above, and the mixture may be continuously mixed.

Separately, a casein solution may be prepared by combining casein with water, and, optionally, an organic amine, and then mixing to form a homogenous solution, having the compositions described above. The casein solution may be combined with the oxazoline polymer mixture.

Next, further optional additives may be combined with the mixture, such as fatty acids and slip agents, in the forms and amounts described above. For example, a fatty acid that includes sodium stearate and a slip agent that includes polyethylene glycol, an alkali-swellable polyacrylate, or a combination thereof, may be combined with the at least one oxazoline polymer and the casein.

The mixture may then be heat to a temperature of about 60° C. to about 90° C., such as from about 75° C. to about 80° C., and mixed at a until substantially homogenous, such as from a period of about 15 to about 30 minutes. For example, the mixture may be mixed with a motorized mixer, such as at a low motor speed.

An adhesion promoter, such as a silane coupling agent, as described above, may optionally be combined with the mixture and mixed for a short period, such as about 5 minutes. A caustic solution, such as a sodium hydroxide solution, may optionally be combined with the mixture and mixed for a short period, such as about 10 to 15 minutes. For example, the mixing temperature may be elevated during these steps, such as to a temperature of about 60° C. to about 90° C., such as 75° C. to about 90° C.

The mixture may optionally be mixed for an additional period (e.g., 10 to 15 minutes) under vacuum.

In certain embodiments, the method includes combining one or more of a humectant and a defoamer with the at least one oxazoline polymer, prior to combination with the casein, and combining a fatty acid, an adhesion promoter, and a caustic solution, with the at least one oxazoline polymer and the casein, to form the adhesive formulation.

In another aspect, glue sticks and other glue products including the adhesive formulations described herein are also provided. In certain embodiments, a glue stick is provided that contains any of the adhesive formulations described herein. For example, the methods may include loading the adhesive formulation into a glue stick dispenser to form the glue stick. For example, suitable glue stick dispensers may be those known to persons of ordinary skill in the art. Other suitable glue products containing the adhesive formulations described herein are also envisioned.

EXAMPLES

The present disclosure is further illustrated by the following examples, which are not to be construed in any way as imparting limitations upon the scope thereof. On the contrary, it is to be clearly understood that resort may be had to various other embodiments, modifications, and equivalents thereof which, after reading the description therein, may suggest themselves to those skilled in the art without departing from the scope of the appended claims.

Example 1

A first exemplary formulation was prepared including oxazoline polymers and casein for providing the desired adhesion properties. The formulation composition is shown in Table 1 below.

TABLE 1

Example 1 Adhesive Formulation

| Ingredient | Description | % (by wt) |
| --- | --- | --- |
| Aquazol 50 | oxazoline polymer | 12.80 |
| Aquazol 200 | oxazoline polymer | 17.90 |
| Glycerin | humectant | 5.00 |
| Byk 045 | defoamer | 0.20 |
| Deionized water | — | 20.50 |
| 25% casein solution | Casein solution | 35.00 |
| (casein) | | (8.75) |
| (AMP 95) | (organic amine) | (3.70) |
| (deionized water) | | (22.55) |
| Sodium stearate | fatty acid | 5.50 |
| Momentive A-1100 | adhesion promoter | 0.10 |
| 10% sodium hydroxide solution | caustic solution | 2.00 |
| Carbowax 3350 | slip agent for lubricity | 1.00 |
| | | 100.00 |

This formulation was manufactured by the following exemplary process: (i) blend Aquazol 50 and Aquazol 200 together, add deionized water and then store the resulting premix at a high temperature (e.g., 80° C.) for 6-8 hours, then mix gently until the mixture is substantially homogeneous; (ii) add glycerin and defoamer and mix gently; (iii) separately, prepare the casein solution by combining the organic amine and water together and adding the casein, then mix the solution until it is a homogeneous solution; (iv) add the casein solution to the batch and mix the solution; (v) add the sodium stearate and Carbowax powders together and add to the batch; (vi) maintain the heat at 75-80° C. and mix at a low spread for about 15-30 minutes or until it is homogeneous; (vii) add the silane coupling agent (Momentive A-1100) while mixing at a low speed and mix for about 5 minutes; (viii) add the 10% caustic solution and mix 10-15 minutes at a low speed, maintaining the mixing temperature at 85° C.; and (ix) mix an additional 10-15 minutes under vacuum.

This process yielded a formulation suitable for use in a glue stick and displaying the desired high adhesion, non-toxicity, ease of application from a suitable dispenser, and water based clean-up properties.

Example 2

A second exemplary formulation was prepared including polyurethane dispersions (PUD) in the formulation for further enhancing adhesion to various surfaces. The formulation composition is shown in Table 2 below.

TABLE 2

Example 2 Adhesive Formulation

| Ingredient | Description | % (by wt) |
|---|---|---|
| Aquazol 50 | oxazoline polymer | 10.76 |
| Aquazol 200 | oxazoline polymer | 17.97 |
| Sancure 2710 | polyurethane dispersion | 3.60 |
| Sancure 12929 | polyurethane dispersion | 3.60 |
| Sancure 20025F | polyurethane dispersion | 3.60 |
| Glycerin | humectant | 2.97 |
| Byk 045 | defoamer | 0.20 |
| Deionized water | — | 26.45 |
| 25% casein solution | caustic solution | 25.00 |
| (casein) | | (6.25) |
| (AMP 95) | (organic amine) | (2.64) |
| (deionized water) | | (16.11) |
| Sodium stearate | fatty acid | 4.65 |
| Momentive A-187 | adhesion promoter | 0.10 |
| 10% sodium hydroxide solution | caustic solution | 1.10 |
| | | 100.00 |

This formulation was manufactured by the following exemplary process: (i) blend Aquazol 50 and Aquazol 200 together, add deionized water and then store the resulting premix at a high temperature (e.g., 80° C.) for 6-8 hours, then mix gently until the mixture is substantially homogeneous; (ii) add glycerin and defoamer and mix gently; (iii) separately, prepare the casein solution by combining the organic amine and water together and adding the casein, then mix the solution until it is a homogeneous solution; (iv) add the polyurethane dispersions to the batch and continue mixing; (v) add the casein solution to the batch and mix the solution; (vi) add the sodium stearate to the batch; (vii) maintain the heat at about 75-80° C. and mix at a low spread for about 15-30 minutes or until it is homogeneous; (viii) add the silane coupling agent (Momentive A-1100) while mixing at a low speed and mix for 5 minutes; (ix) add the 10% caustic solution and mix 10-15 minutes at a low speed, maintaining the mixing temperature at 85° C.; and (x) mix an additional 10-15 minutes under vacuum.

This process yielded a formulation suitable for use in a glue stick and displaying the desired high adhesion, non-toxicity, ease of application from a suitable dispenser, and water based clean-up properties.

Example 3

A third exemplary formulation was prepared including a lubricant in the formulation for further enhancing the ease of application for the product. The formulation composition is shown in Table 3 below.

TABLE 3

Example 3 Adhesive Formulation

| Ingredient | Description | % (by wt) |
|---|---|---|
| Aquazol 50 | oxazoline polymer | 12.50 |
| Aquazol 200 | oxazoline polymer | 17.50 |
| Glycerin | humectant | 5.00 |
| Byk 045 | defoamer | 0.20 |
| Deionized water | — | 21.20 |
| 25% casein soln. | caustic solution | 35.00 |
| (casein) | | (8.75) |
| (AMP 95) | (organic amine) | (3.70) |
| (deionized water) | | (22.55) |
| Sodium stearate | fatty acid | 5.50 |
| Momentive A-1100 | adhesion promoter | 0.10 |
| 10% sodium hydroxide solution | caustic solution | 2.00 |
| Paragum 500 | slip agent for lubricity | 1.00 |
| | | 100.00 |

This formulation was manufactured by the following exemplary process: (i) blend the Aquazol 50 and Aquazol 200 together, add deionized water and then store the resulting premix at a high temperature (e.g., 80° C.) for 6-8 hours and mix gently until the mixture is found to be homogeneous; (ii) add glycerin and the defoamer and mix gently; (iii) separately, prepare the casein solution by combining the organic amine and water together and adding the casein and mix the solution until it is a homogeneous solution; (iv) add the casein solution to the batch and mix the solution; (v) add the sodium stearate and Paragum 500 together and add to the batch; (vi) maintain the heat at 75-80° C. and mix at a low spread for 15-30 minutes or until it is homogeneous; (vii) add the silane coupling agent (Momentive A-1100) while mixing at a low speed and mix for 5 minutes; (viii) add the 10% caustic solution and mix 10-15 minutes at a low speed, maintaining the mixing temperature at 85° C.; (ix) mix an additional 10-15 minutes under vacuum.

This process yielded a formulation suitable for use in a glue stick and displaying the desired high adhesion, non-toxicity, ease of application from a suitable dispenser, and water based clean-up properties.

Example 4: Comparative Strength Testing of Adhesive Formulations

The lap shear strength of a glue stick having the formulation of Example 1 was tested and compared to the lap shear strength of commercially available PVP based glue sticks, using various substrate material combinations. Specifically, one inch by three inch substrate specimens (having 3/16" thickness) of the specified materials (maple/maple, maple/plastic, maple/anodized aluminum) were prepared and used to glue a one square inch overlapped section. After a set dry time, the adhered specimen was placed in a Universal Testing Machine and pulled apart to obtain a tensile strength in psi. The results of the lap shear strength tests for a representative sample of currently available Elmer's All-Purpose and Elmer's Extra-Strength glue sticks (both PVP based) compared to an oxazoline-based glue stick made using the adhesive formulation of Example 1 are show below in Table 4.

TABLE 4

Example 4 Lap Shear Strength Test Results

| | maple/maple | maple/plastic | maple/anodized aluminum |
|---|---|---|---|
| Elmer's All-Purpose Glue Stick | 250 psi | 106 psi* | 220 psi |
| Elmer's Extra- | 385 psi | 108 psi* | 389 psi |

TABLE 4-continued

Example 4 Lap Shear Strength Test Results

|  | maple/maple | maple/plastic | maple/anodized aluminum |
|---|---|---|---|
| Strength Glue Stick Formulation of Example 1 | 641 psi | 124 psi* | 641 psi |

*plastic substrate broke when tested

As can be seen from the results, the oxazoline based glue stick formulation provided significantly better adhesive strength for the sample materials, especially the wood to wood and wood to metal samples. Current commercially available glue stick products predominantly use PVP in their formulations have good properties regarding paper and simple substrate adhesion. However, as can be seen from the results, more difficult substrates, such as wood, plastic, and metal substrates like those common in DIY applications, pose a challenge.

Thus, the presently described adhesive formulations display enhanced adhesion, especially to non-wood or non-paper substrates, compared with current PVP and PVA based technologies, while still maintaining good package stability and ease of lubricity, while also allowing for water based clean-up due to the waterborne nature of the formulations. Moreover, the present formulations overcome known limitations associated with storing casein based products. Specifically, casein products commonly must be stored at cooler temperatures to maintain shelf life, because these formulations are compromised over time at warmer temperatures. The presently described glue formulations, which combine casein in an oxazoline based formulation, provide a strong, versatile glue stick without compromising the package stability of the formulation.

While the disclosure has been described with reference to a number of example embodiments, it will be understood by those skilled in the art that the invention is not limited to such embodiments. Rather, the invention can be modified to incorporate any number of variations, alterations, substitutions, or equivalent arrangements not described herein, but which are commensurate with the spirit and scope of the invention. Additionally, while various example embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of making an adhesive formulation, comprising:
combining at least one oxazoline polymer and casein to form an adhesive formulation,
wherein at least two oxazoline polymers are mixed with deionized water, stored at a temperature between 70 and 90° C. for a period of at least 4 hours, and then mixed to form a substantially homogenous mixture, prior to combination with the casein.

2. The method of claim 1, wherein the at least one oxazoline polymer comprises poly(2-ethyl-2-oxazoline).

3. The method of claim 1, wherein the at least one oxazoline polymer is combined in an amount such that the at least one oxazoline polymer is present in the adhesive formulation in an amount of from about 5 percent to about 50 percent, by weight of the formulation.

4. The method of claim 1, further comprising combining a polyurethane dispersion with the at least one oxazoline polymer, prior to combination with the casein.

5. The method of claim 4, wherein the polyurethane dispersion comprises an aliphatic urethane polymer dispersion.

6. The method of claim 1, wherein the casein is in the form of a casein solution comprising casein in an amount from about 10 percent to about 40 percent, by weight of the solution.

7. The method of claim 6, wherein the casein solution further comprises an organic amine and deionized water.

8. The method of claim 7, wherein the organic amine comprises 2-amino-2-methyl-1-propanol.

9. The method of claim 1, wherein the casein is combined in an amount such that casein is present in the adhesive formulation in an amount of from about 1 percent to about 20 percent, by weight of the formulation.

10. The method of claim 1, further comprising loading the adhesive formulation into a glue stick dispenser.

11. A method of making an adhesive formulation, comprising:
combining at least one oxazoline polymer and casein to form an adhesive formulation,
wherein the casein is in the form of a casein solution comprising casein in an amount from about 10 percent to about 40 percent, by weight of the solution, and
wherein the casein solution further comprises an organic amine and deionized water.

12. The method of claim 11, wherein the organic amine comprises 2-amino-2-methyl-1-propanol.

* * * * *